(12) United States Patent
Wilson

(10) Patent No.: US 6,292,132 B1
(45) Date of Patent: Sep. 18, 2001

(54) SYSTEM AND METHOD FOR IMPROVED ACCURACY IN LOCATING AND MAINTAINING POSITIONS USING GPS

(75) Inventor: Christopher Kenneth Hoover Wilson, Redwood City, CA (US)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/373,560

(22) Filed: Aug. 13, 1999

(51) Int. Cl.$^7$ ............................... H04B 7/185; G01S 5/02
(52) U.S. Cl. ............................... 342/357.02; 342/357.08; 342/357.11; 342/357.14
(58) Field of Search ..................... 342/357.02, 357.14, 342/357.11, 357.08; 701/215, 216

(56) References Cited

U.S. PATENT DOCUMENTS

| | | | |
|---|---|---|---|
| 5,185,610 | * | 2/1993 | Ward et al. ................ 342/357.11 |
| 5,617,317 | * | 4/1997 | Ignagni ........................... 701/215 |
| 5,745,868 | * | 4/1998 | Geier .............................. 701/216 |

* cited by examiner

*Primary Examiner*—Thomas H. Tarcza
*Assistant Examiner*—Fred H. Mull
(74) *Attorney, Agent, or Firm*—Crowell & Moring LLP

(57) ABSTRACT

A system and method are provided for using multiple GPS antennas and corresponding processors on a single vehicle in order to both maintain position information when fewer than four GPS satellites are visible and to reduce position errors by minimizing multipath induced errors using information combined from the multiple systems. The system and method calculates differential path lengths between the received position information signals and at least two antenna/processor pairs to determine cone angles therebetween. The position information of the mobile vehicle is maintained based on the initial position information and the determined cone angles.

7 Claims, 4 Drawing Sheets

SYSTEM AND METHOD FOR IMPROVED ACCURACY IN LOCATING AND MAINTAINING POSITIONS USING GPS

BACKGROUND AND SUMMARY OF THE INVENTION

The invention relates generally to the field of position determination and, more particularly, to the field of position determination using GPS to precisely determine and maintain a position of a mobile platform such as a vehicle.

Position determination using conventional GPS (Global Positioning System) is well known in the art. GPS involves a system of satellites orbiting the earth and continuously broadcasting GPS signals which include both timing information for determining when the GPS signal was broadcast and data information as to the broadcasting satellites' orbital position. Position determination is accomplished using a receiver arranged at the position to be determined, for example the receiver can be in a movable platform such as a land, sea or air vehicle. The receiver makes ranging measurements between an antenna coupled to the receiver and each of at least four GPS satellites in view. These measurements are made from the timing information and the orbital position information from each satellite. Based on the four different GPS signals received, a fairly accurate position determination can be made.

In order to provide a more accurate position determination, other forms of GPS are well known, such as ordinary differential GPS, carrier phase differential GPS and dual frequency wide-laning GPS for example. While having different degrees of accuracy, all of these systems require that signals be received from at least four GPS satellites. In general, the requirement for four GPS satellite signals does not pose much of a problem for both air and sea vehicles, which operate in environments having an extremely limited number of obstructions. For land based vehicles, however, especially those operating in urban environments, the availability of four GPS signals is quite often limited. This can be due to obstructions caused by buildings and the like.

For a general discussion of the background and history of GPS position determination systems, reference can be made to U.S. Pat. No. 5,548,293 which discloses a known aircraft attitude determination method and system using four GPS antennas mounted on the aircraft in order to receive GPS signals of at least four GPS satellites, the specification of U.S. Pat. No. 5,548,293 being incorporated herein by reference.

Moreover, in particular when operating in an urban environment, the signals received by the vehicle are often subject to multipath errors. Multipath results from the numerous reflections the GPS signals undergo due to the structures in the area through which the vehicle is traveling. Multipath on a signal occurs when the receiver antenna picks up signals that have been reflected off of a surface between the emitter and receiver. GPS multipath can shift the computed position of the receiver significantly. For vehicles, the primary source of multipath is buildings, overhead foliage, and other vehicles. Multipath is often detected due to differences between GPS location and that computed using other sensors, however, the GPS receiver itself is often unaware of the multipath condition, thus the GPS positions are given undue weight in position determination, resulting in erroneous track of the vehicle. The multipath errors or noise substantially degrades the accuracy of the position determination.

There is therefore needed a position determining system and method which provides improved accuracy while minimizing the effects of multipath or other noise sources. These needs are met according to the present invention by providing a system and method using multiple GPS antennas and corresponding processors on a single vehicle in order to both maintain position information when fewer than four GPS satellites are visible and to reduce position errors by minimizing multipath induced errors using information combined from the multiple systems. While the present invention is described with respect to GPS signals, it should be readily understood that the system and method are applicable with any stable signal structure, such as from a satellite or other type of transmitter arranged at a known location.

In an embodiment of the present invention, multiple antenna/processor pairs are provided on a single platform, such as a vehicle. Position information is obtained by determining a cone angle between the various antenna/processor pairs and a single GPS satellite at a known orbital position. This cone angle is determined based on the differential path lengths between the single GPS satellite and at least two antennas on the vehicle. By providing a sufficient number of antenna baselines, along with a single GPS satellite, information on the attitude of the vehicle can be maintained over time given a known starting attitude. This is because a land vehicle is constrained in its movement along a specific axis, either forward or backward. Given this known constraint, the magnitude of the vehicle motion can therefore be determined from the Doppler shifts associated with a single satellite. The accuracy of this method is determined by the relative geometry of the antenna baselines and the satellite.

Advantageously, the position information obtained by determining the cone angle between the two antenna/processor pairs is implemented using a common clock between the processor receivers such that a single satellite is adequate. Of course, the inventive method is also applicable to receivers having independent clocks, in which case at least two satellites are required.

In another advantageous embodiment according to the present invention, the GPS signals or information received from the two antennas mounted on the vehicle can be combined to reduce noise effects, such as multipath. Correlation techniques can reduce noise effects by averaging out noise sources that do not correlate across the two antenna/receiver systems arranged on the vehicle. By minimizing the noise effects, the overall accuracy of the system can be improved.

By using multiple antennas on a single vehicle, it is also possible to assess the signal environment surrounding the vehicle. Based on the assessed signal environment, the present invention makes it possible to estimate the accuracy of the position determination. For example, multipath can introduce uncorrelated noise into the two receivers mounted on the vehicle. Alone, such noise cannot be detected by either receiver system. But, by comparing and correlating the two receivers, the system can determine the presence of a high multipath environment surrounding the vehicle. Accordingly, action can be taken to reduce the estimated position accuracy.

When the GPS position determination system is used in conjunction with other known position determining systems, it is possible to increase the position determination accuracy with the knowledge of the multipath condition by enabling the position determining algorithm to decrease its reliance (or weighting) on GPS information and rely more heavily on information from other position determining systems.

Any number of techniques can be used in accordance with the present invention to detect a multipath environment surrounding the vehicle. For example, multipath can be detected when correlating between the multiple antenna/receivers mounted on the vehicle by (a) comparing position, (b) correlating phase histories of a given GPS satellite, and/or (c) correlating drop-outs in received GPS satellite signals.

The present invention allows for a more accurate and more robust position determining system for vehicles, especially those moving in a restricted environment due to obstructions of the reference transmitters, such as the GPS satellites. Increasing the accuracy and availability of position information will, of course, provide numerous advantages in the field of vehicle tracking and its application for other purposes.

Other objects, advantages and novel features of the present invention will become apparent from the following detailed description of the invention when considered in conjunction with the accompanying drawings.

DETAILED DESCRIPTION OF THE DRAWINGS

Figure 1:
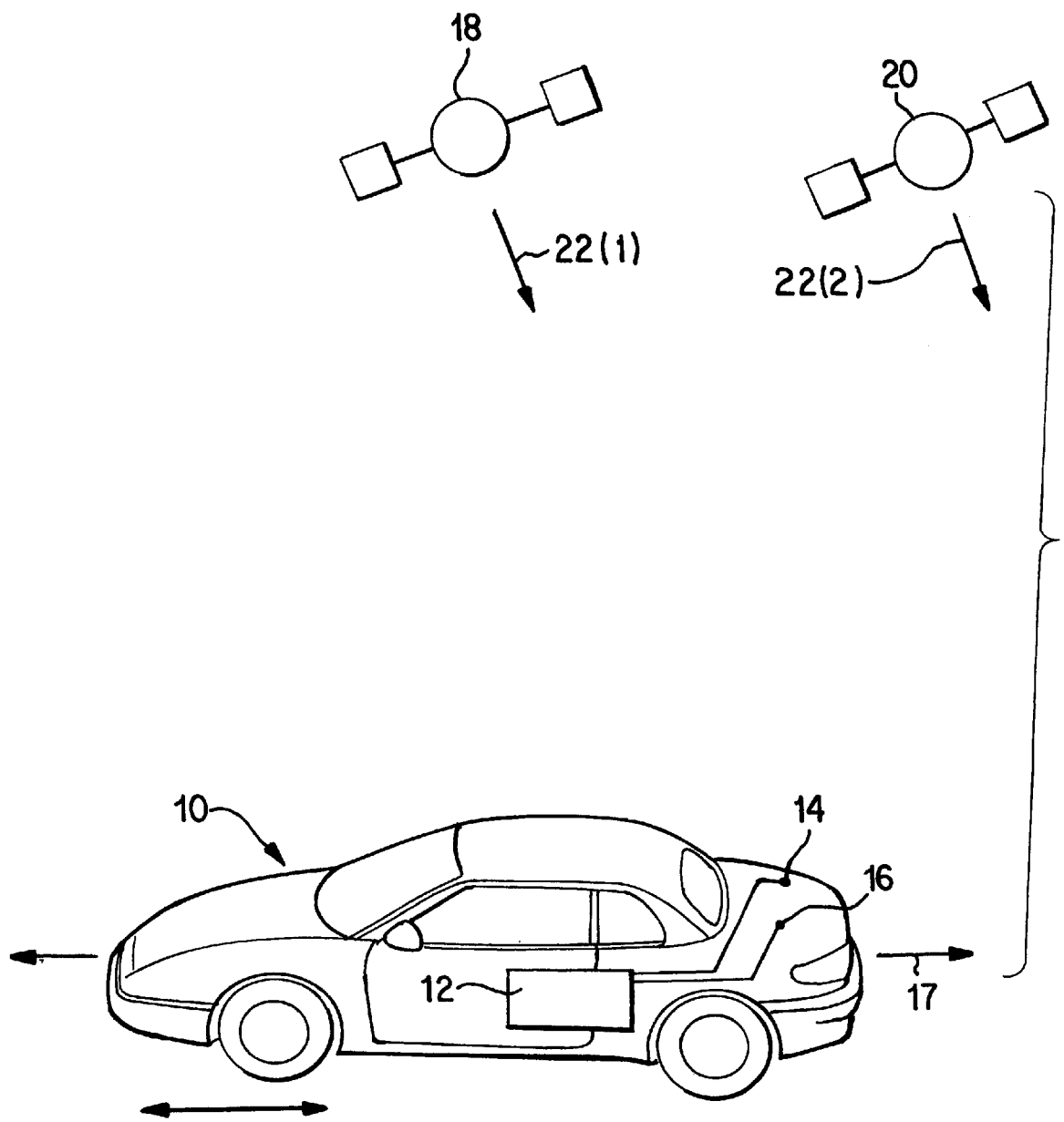
FIG. 1 generally represents a system according to the present invention by which position information is maintained when fewer than four GPS satellites are visible and in which position errors can be minimized.

Referring to FIG. 1, a mobile platform, such as a motor vehicle 10 is shown equipped with the system according to the present invention for increasing the accuracy of position determination and maintaining the position information when less than four satellites are visible. While the mobile platform is shown as a vehicle 10, it is understood that it could be any type of mobile device or person desirous of knowing and maintaining positional information. The system includes at least two antennas 14, 16 coupled to a processing system 12. These antennas 14, 16 receive information signals from at least one satellite 18, 20 such as known GPS satellites presently orbiting the earth. The GPS satellites 18, 20 broadcast GPS signals 22 (1) and 22 (2) as was discussed above. The antennas 14, 16 are arranged on the vehicle 10 so as to have a known and defined spacing and orientation relative to one another and the vehicle longitudinal axis (arrow 17).

Figure 2:
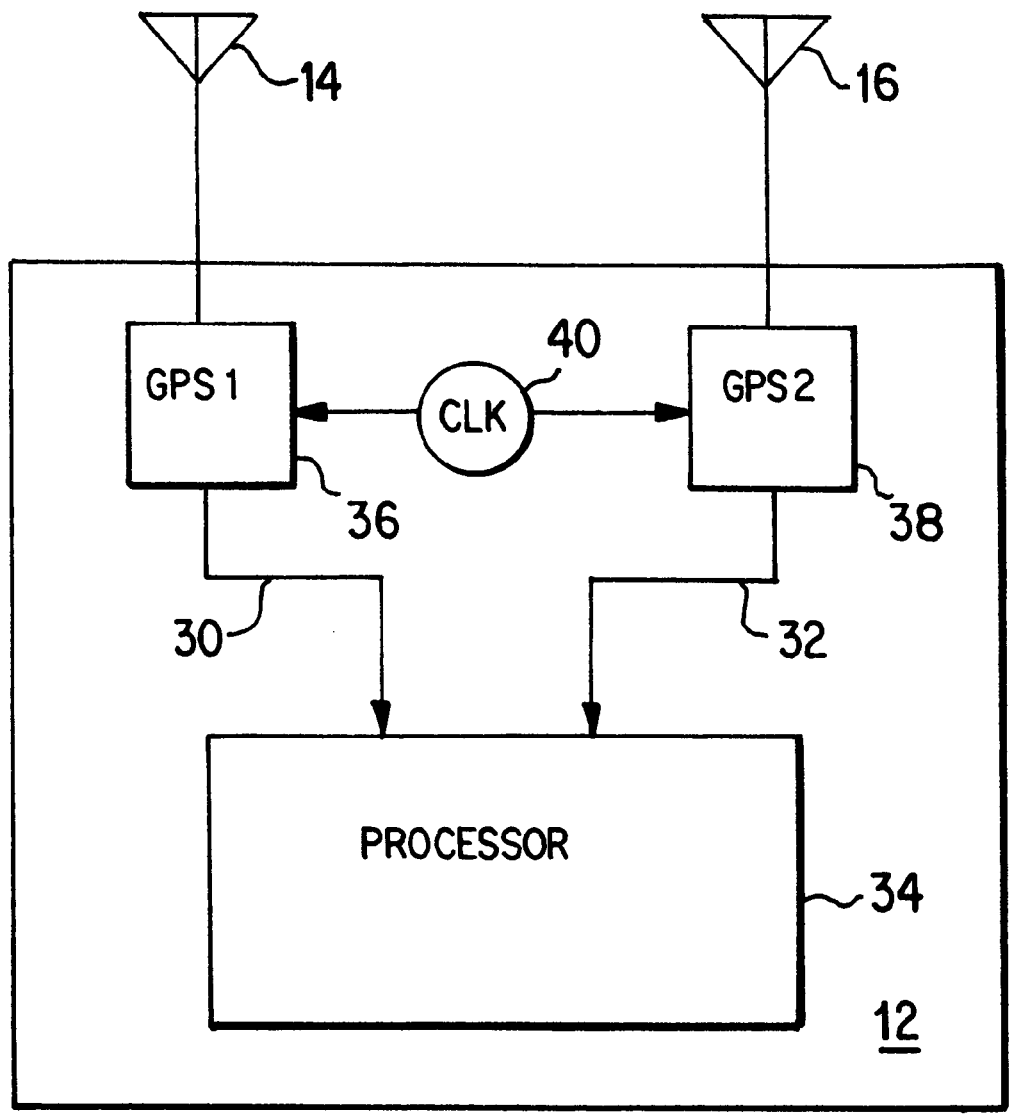
FIG. 2 is a general block diagram of the heading processor in the system according to the present invention.

Referring to FIG. 2, the schematic block diagram of the system illustrates the antennas 14, 16 coupled to respective GPS receivers 36, 38. Ideally, the GPS receivers 36, 38 are controlled by a common clock 40 such that the system can operate based on a single satellite signal 22 (1) or 22 (2). If, however, each GPS receiver 36, 38 includes its own independent clock (not shown), then at least two satellite signals 22 (1) and 22 (2) will be required. The processed GPS signals provide phase information 30, 32 which is provided to a heading processor 34. The heading processor 34 calculates the angle to the satellite.

Figure 3:
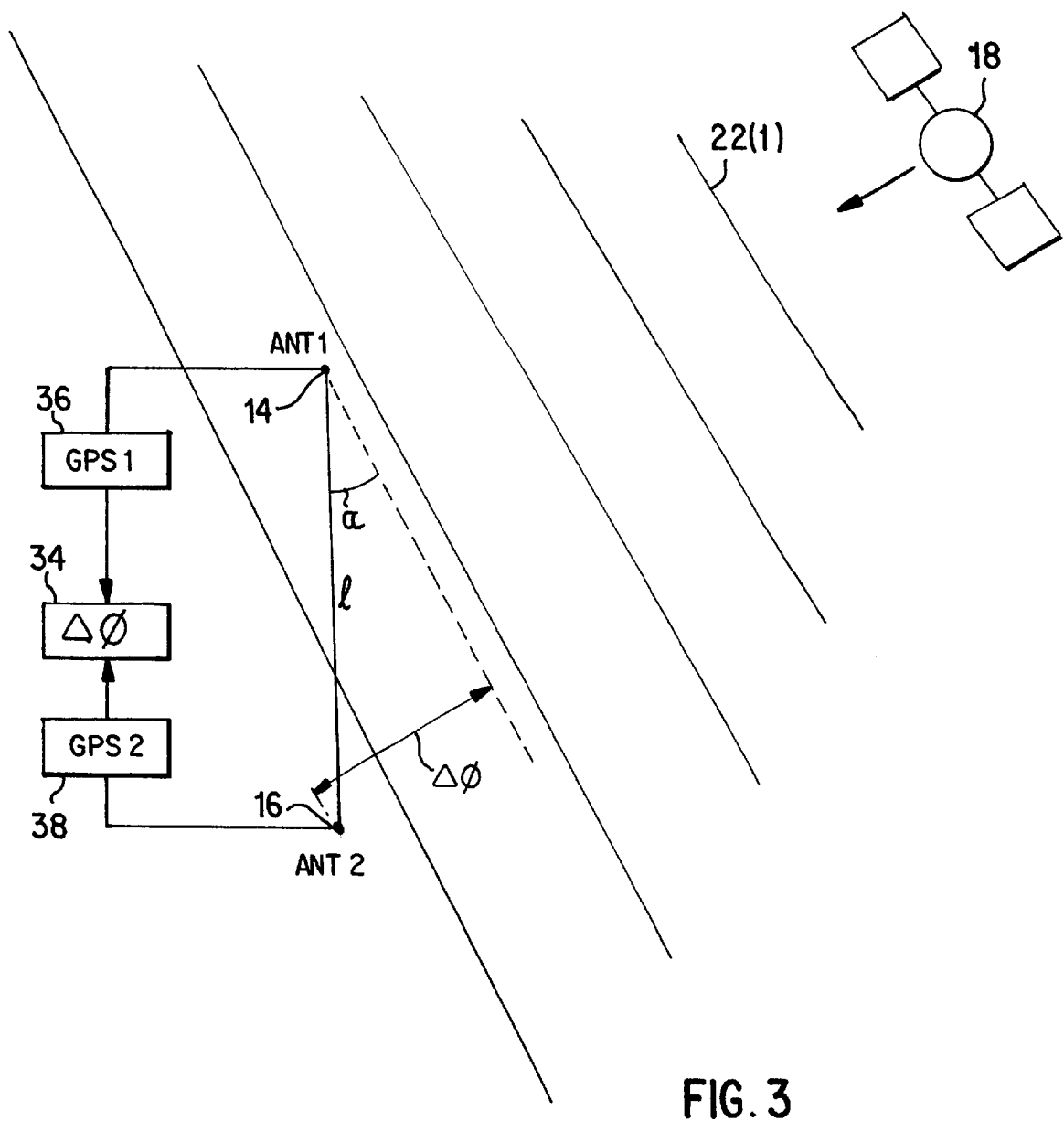
FIG. 3 is a representation illustrating the process for Ad determining a cone angle between two antenna/processor pairs and a GPS satellite at a known position.

FIG. 3 illustrates the technique employed to determine the angle to the satellite based on the phase difference between the GPS signals received by the respective antennas. As shown, satellite 18 broadcasts signal 22(1) which is received by both antenna 1(14) and antenna 2(16). The antennas 14, 16 have a defined spacing "1" between them. Depending upopn the heading of the vehicle 10, the satellite signal 22(1) reaches the respective antennas phase offset with respect to one another. This offset is represented in FIG. 3 by the phase difference Δϕ. This phase difference Δϕ is determined from the phase information output from the GPS receivers 36, 38 to the heading processor 34. The processor 34 can then determine the angle of the vehicle to the satellite 18 in accordance with the equation:

$$\sin(\alpha) = \frac{a}{l}$$

$$\text{where } \Delta\varphi = a\frac{2\pi}{\lambda}$$

where λ is wavelength of satellite signal 22(1) and $$\text{therefore } \sin\alpha = \frac{\lambda}{2\pi l}\Delta\varphi.$$

In accordance with the invention, given a known beginning heading (attitude) of the vehicle 10, the subsequent heading information of the vehicle can be accurately maintained based on a plurality of antenna baselines receiving the single satellite signal. Because the vehicle is constrained to move along a specific axis 17, i.e., forward and backward, the magnitude of the vehicle motion is determined from the single satellite Doppler shifts. The relative geometry of the antenna baselines and the satellite determine the accuracy and effectiveness of this process for maintaining the heading information.

In addition to accurately maintaining the vehicle heading over time to increase the accuracy of the position determination, the processor 34 of the present invention also operates to reduce position errors by combining information from the two systems 14, 36 and 16, 38. By combining the signals or information detected by the antennas 14, 16 and received by the GPS receivers 36, 38, noise effects can be reduced by averaging out noise sources that do not correlate across the two systems. Because the separate antenna/receiver systems may be affected differently by noise sources due to the different spatial arrangement of the antennas relative to the vehicle and the possible noise source, the processor 34 can operate to average out those sources of noise not specifically correlating between the two antenna/receiver systems.

The multiple antenna/receiver system can also use correlation to assess the external signal environment around the vehicle in order to make an estimation of the accuracy of the position determination. For example, multipath effects may introduce uncorrelated noise into the two receivers 36, 38, which cannot be detected by either receiver system alone. But, when comparing the information from the two receivers 36, 38 in the processor 34, it is possible to determine the presence and degree of multipath in the environment. Appropriate action can thus be taken with respect to the position determining output.

Figure 4:
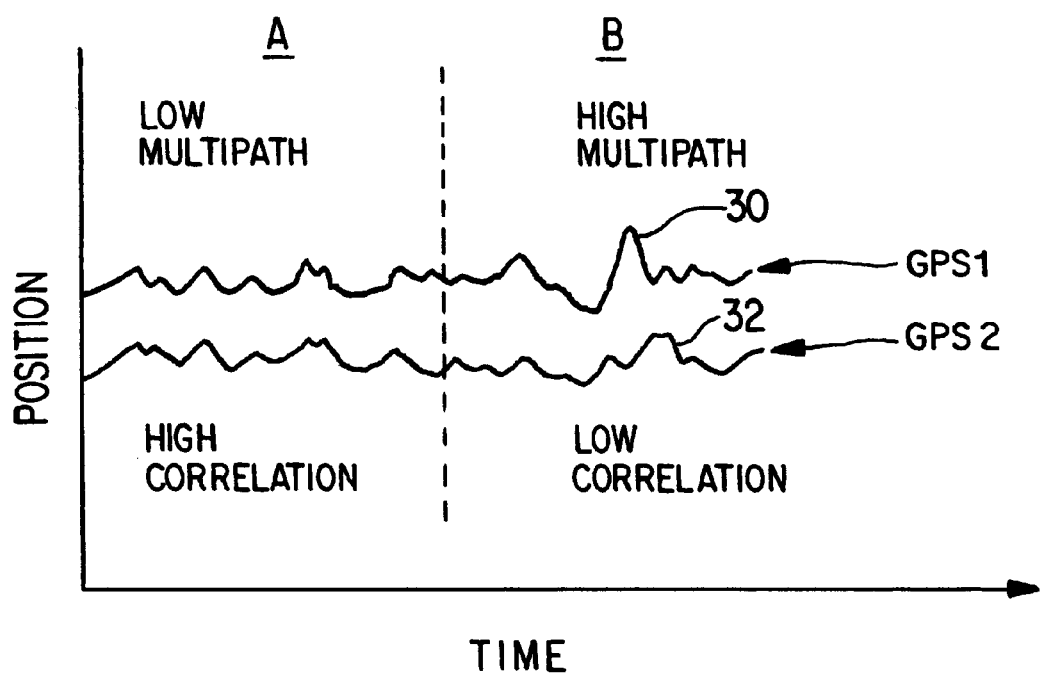
FIG. 4 is a graphical representation illustrating a correlation of received GPS signals to determine the surrounding multipath environment.

FIG. 4 graphically illustrates the determination of the multipath environment. The graph illustrates the correlation between signals received by the different receivers 36, 38 as a function of position versus time. As shown in part A of FIG. 4, the received signals 30, 32 have a high correlation, thus indicating a low multipath environment. In such a situation, the position determining system can have a high confidence in its position estimation. In part B of FIG. 4, the received signals 30, 32 are shown having a low correlation with respect to one another. This indicates a high multipath environment. As a result, the position determining system may reduce the estimated positional accuracy or modify the weighting parameters used in the position determining equations to reflect the high multipath environment.

When the described GPS position determining system is used in conjunction with other types of position determining systems, such as those based on road side infrastructures or internal vehicle gyroscopes, the knowledge of the multipath environment can be used to reduce the reliance on the GPS information. For example, if a high multipath environment is determined, the position determining algorithm would decrease the weight given to the GPS information in order to rely more heavily on the other position determining systems. This results in more accurate position determinations overall.

When correlating between multiple antennas to detect the multipath environment, any number of known techniques can be used. For example, the correlation between the multiple antennas can be comparisons of position, correlation of phase histories of a given satellite, and/or correlation of drop-outs of received satellite signals.

The use of multiple GPS systems to improve the accuracy and availability of position determinations is advantageous for mobile platforms, such as vehicles, moving in environments with potential obstructions between the antennas and the reference transmitters, such as GPS satellites. These advantages are accomplished by allowing the positional information to be accurately maintained over time based on less than four satellite signals (which are required to obtain the initial position). The invention is especially useful for vehicles traveling in urban areas wherein obstructions, such as skyscrapers and other buildings likely exist. At the same time, the urban areas tend to have a large number of position determining system users due to the difficulties of navigating such urban areas and the concentration of business personnel. These heavily obstructed urban areas are also more likely to have multipath environments. Accordingly, the present invention is especially advantageous in such areas.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of maintaining position information over time after initial position information is obtained on a mobile platform, the method comprising the acts of:

receiving less than four position information signals from known locations in the mobile platform;

calculating differential path lengths between each of the received position information signals and at least two antenna/processor pairs to determine cone angles therebetween; and maintaining the position information of the mobile platform based on the initial position information and the determined cone angles.

2. The method according to claim 1, wherein the act of calculating to determine the cone angles comprises the acts of:

processing phase information from the position information signals received by each antenna/processor pair to obtain a phase difference; and determining the cone angles based on the phase difference.

3. The method according to claim 2, wherein the act of determining the cone angles based on the phase difference calculates the cone angles in accordance with $$\sin(\alpha) = \frac{\lambda \Delta \Phi}{2\pi l}$$

wherein $\Delta\phi$ in the phase difference, $\lambda$ is the wavelength of the information signal and l is a defined spacing between the antenna pairs.

4. A system for maintaining position information, based on an initial position of a mobile platform, the system comprising:

at least two antennas mounted on the mobile platform;

less than four position information signals from position transmitters arranged at known locations;

position processors coupled to said antennas, each of position information signals detected by said antennas being processed into phase information; and a heading processor coupled to receive said phase information from said position processors to maintain the position information on the mobile platform over time based on the known initial position.

5. The system according to claim 4, wherein the position information signals are GPS signals from GPS satellites and the position processors are GPS receivers.

6. The system according to claim 5, further comprising a common clock arranged between the GPS receivers, whereby only a single GPS signal from a single GPS satellite is required.

7. The system according to claim 5, further comprising independent clocks provided for each position processor, wherein at least two GPS signals from at least two GPS satellites are required.

* * * * *